(12) United States Patent
Kawanishi et al.

(10) Patent No.: US 7,387,396 B2
(45) Date of Patent: *Jun. 17, 2008

(54) OUTSIDE MIRROR APPARATUS FOR VEHICLE

(75) Inventors: Joichi Kawanishi, Isehara (JP); Keisuke Honda, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/594,226

(22) Filed: Nov. 8, 2006

(65) Prior Publication Data

US 2007/0103921 A1    May 10, 2007

(30) Foreign Application Priority Data

Nov. 9, 2005    (JP)    ............................. 2005-325126

(51) Int. Cl.
*G02B 7/182* (2006.01)
*B60R 1/06* (2006.01)
*B60R 1/12* (2006.01)

(52) U.S. Cl. ...................... 359/871; 359/838; 362/494

(58) Field of Classification Search ................ 359/838, 359/871, 872; 362/494
See application file for complete search history.

(56) References Cited

U.S. PATENT DOCUMENTS

| | | | | |
|---|---|---|---|---|
| 5,497,306 A | * | 3/1996 | Pastrick | .................... 362/494 |
| 5,660,457 A | * | 8/1997 | Lyons | ........................ 362/494 |
| 6,099,153 A | * | 8/2000 | Zimmermann et al. | ..... 362/494 |
| 6,139,171 A | * | 10/2000 | Waldmann | ................... 362/494 |
| 6,250,783 B1 | * | 6/2001 | Stidham et al. | ............. 362/494 |
| 6,264,353 B1 | * | 7/2001 | Caraher et al. | ............. 362/494 |
| 6,568,839 B1 | * | 5/2003 | Pastrick et al. | ............. 362/494 |
| 6,695,465 B2 | * | 2/2004 | Apfelbeck | .................. 362/494 |
| 6,769,798 B2 | * | 8/2004 | Mishimagi | .................. 362/522 |
| 6,814,476 B2 | * | 11/2004 | Assinder et al. | ............ 362/492 |
| 6,880,960 B2 | * | 4/2005 | Mishimagi | .................. 362/522 |
| 6,932,497 B1 | * | 8/2005 | Huang | ........................ 362/494 |
| 7,104,662 B2 | * | 9/2006 | Kawanishi | .................. 359/871 |

FOREIGN PATENT DOCUMENTS

| | | | |
|---|---|---|---|
| JP | 2002-096684 | * | 4/2002 |
| JP | 2002-337606 A | | 11/2002 |

* cited by examiner

*Primary Examiner*—Ricky D Shafer
(74) *Attorney, Agent, or Firm*—Foley & Lardner LLP

(57) ABSTRACT

A mirror housing includes a temporary fixing member that is formed of a plate having a groove. An additional part includes a temporary fixing member that includes an insertion portion engaged with the groove to position and guide the additional part in a setting direction and a first direction, and a contacting portion that contacts the plate to position and guide the additional part in a second direction.

3 Claims, 10 Drawing Sheets

FIG.9
FIG.10
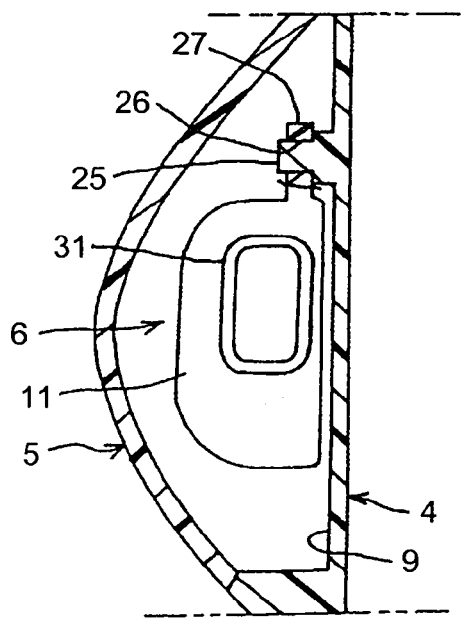
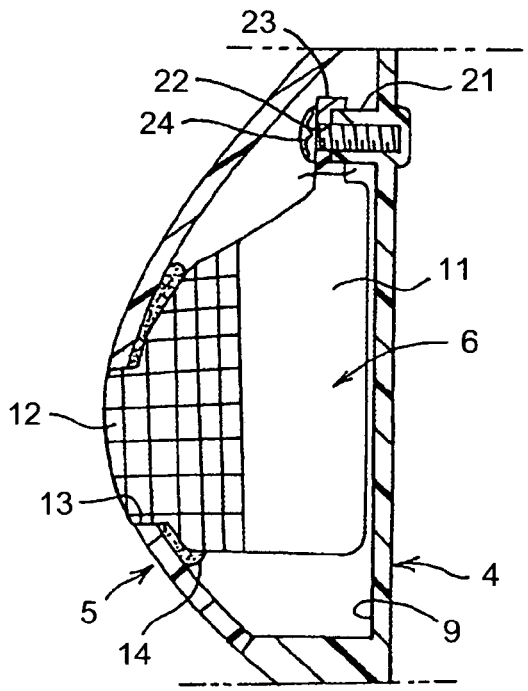
FIG.11
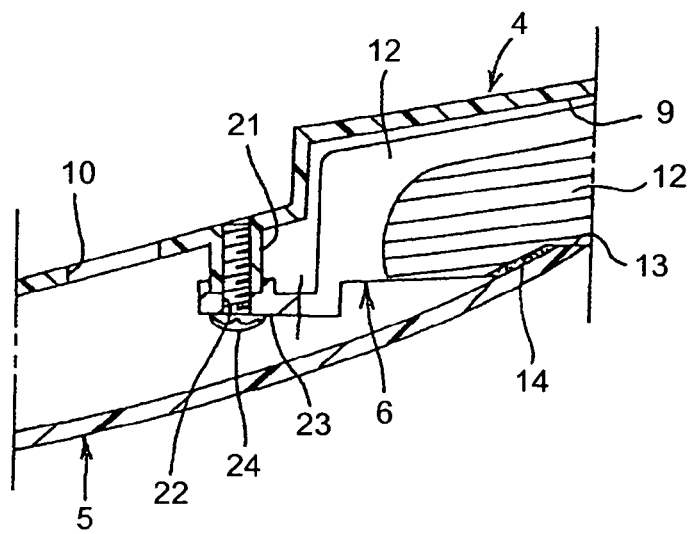

FIG.12
FIG.13
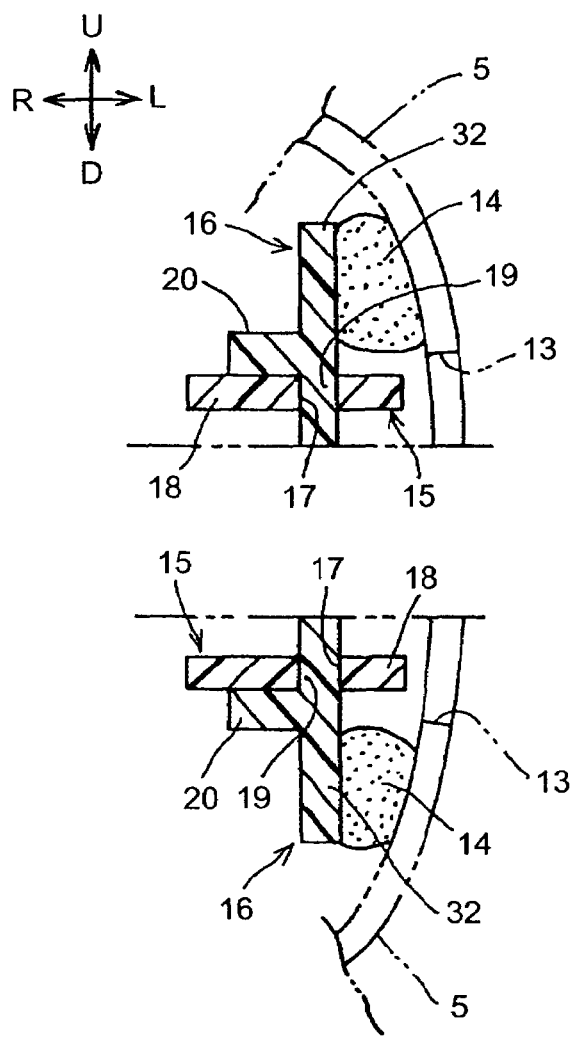
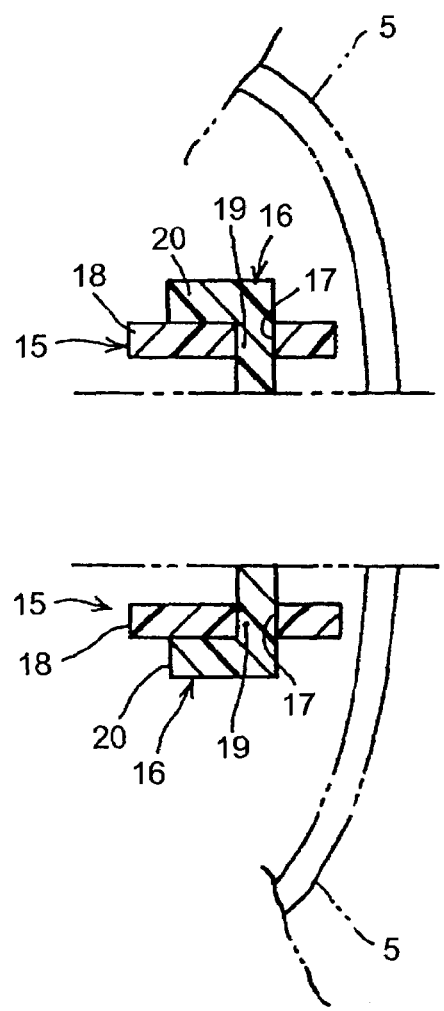

OUTSIDE MIRROR APPARATUS FOR VEHICLE

CROSS-REFERENCE TO RELATED APPLICATIONS

The present document incorporates by reference the entire contents of Japanese priority document, 2005-325126 filed in Japan on Nov. 9, 2005.

BACKGROUND OF THE INVENTION

1. Field of the Invention

The present invention relates to an outside mirror apparatus for a vehicle that includes an attachment.

2. Description of the Related Art

There have been outside mirror apparatuses for a vehicle that include an additional part such as a lighting system and an image pickup device. For example, Japanese Patent Application Laid-open No. 2002-337606 discloses such an outside mirror apparatus for a vehicle. The conventional outside mirror apparatus has a configuration such that a base of a lamp unit is inserted from an opening of a cover and coupled to the backside of a housing by a clip, and an illuminator of the lamp unit is engaged with the opening by a coupling strength of the clip.

The conventional outside mirror apparatus, however, has no guiding and positioning member for fixing the lamp unit to the housing and the cover. Thus, there is a need of a technology for fixing the lamp unit to the housing and the cover easily and reliably.

SUMMARY OF THE INVENTION

It is an object of the present invention to at least partially solve the problems in the conventional technology.

According to an aspect of the present invention, an outside mirror apparatus for a vehicle includes a mirror housing that includes a first fixing member and a second fixing member, and an attachment that includes a third fixing member engaged with the first fixing member to temporarily fix the attachment to the mirror housing and a fourth fixing member engaged with the second fixing member to firmly fix the attachment to the mirror housing. When the attachment is temporarily fixed to the mirror housing, the first and third fixing members position and guide the attachment in a setting direction in which the attachment is set on the mirror housing and in first and second directions substantially perpendicular to the setting direction and substantially perpendicular to each other. Any one of the first and third fixing members includes a plate substantially parallel to the setting direction with a groove that tapers in the setting direction, and another one of the first and third fixing members includes an insertion portion that engages with the groove and positions and guides the attachment in the setting direction and the first direction, and a contacting portion that contacts the plate, and positions and guides the attachment in the second direction.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a cross section taken along a line IX-IX in FIG. 7;

FIG. 10 is a cross section taken along the line X-X in FIG. 7;

FIG. 11 is a cross section taken along the line XI-XI in FIG. 7;

FIG. 12 is a cross section taken along a line XII-XII in FIG. 8;

FIG. 13 is a modification of the cross section shown in FIG. 12 which includes no sealing-contacting portion;

DETAILED DESCRIPTION OF THE PREFERRED EMBODIMENTS

Figure 1:
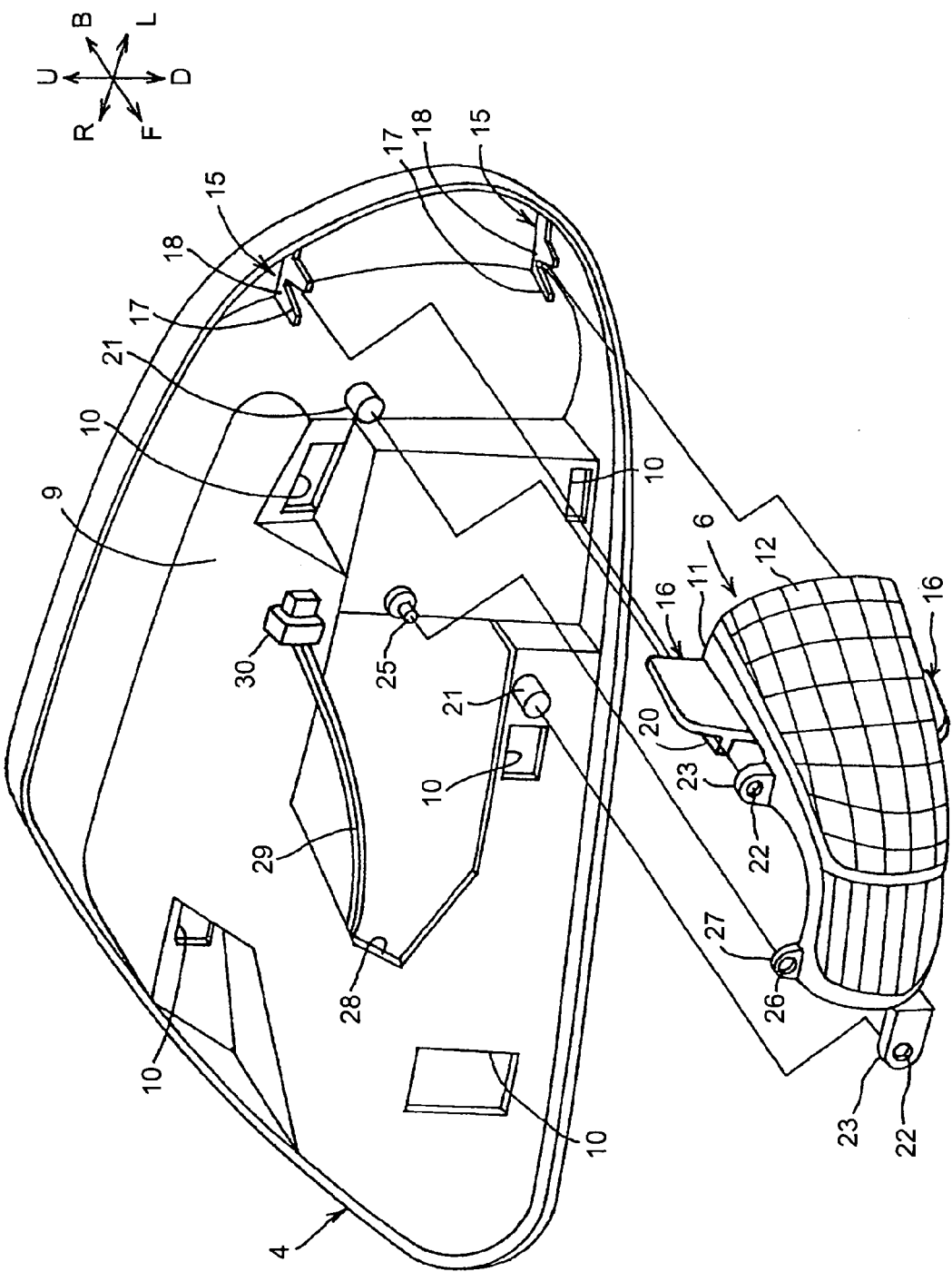
FIG. 1 is an exploded perspective view of a mirror housing and a side-turn signal lamp of an outside mirror apparatus for a vehicle according to an embodiment of the present invention.

Exemplary embodiments of the present invention are explained below with reference to the accompanying drawings. In the drawings, reference character F designates the forward or front side of a vehicle (direction in which the vehicle is driven), B a backside of the vehicle, U the upside of the vehicle as viewed forward from a driver, D the downside of the vehicle as viewed forward from the driver, L the left side of the vehicle as viewed forward from the driver, and R the right side of the vehicle as viewed forward from the driver.

According to an embodiment of the present invention, an outside mirror apparatus for a vehicle is applied to vehicle door mirrors. The door mirrors include a left door mirror 1 and a right door mirror 1 on left and right doors (not shown) of the vehicle. The left and right door mirrors 1 are substantially the same but symmetrical in construction, and therefore, one of them, the left door mirror 1, is described in detail. In the embodiment, the left side L is an outer (sidewalk or pedestrian) side with respect to the vehicle, while the right side R is an inner (center) side with respect to the vehicle.

Figure 2:
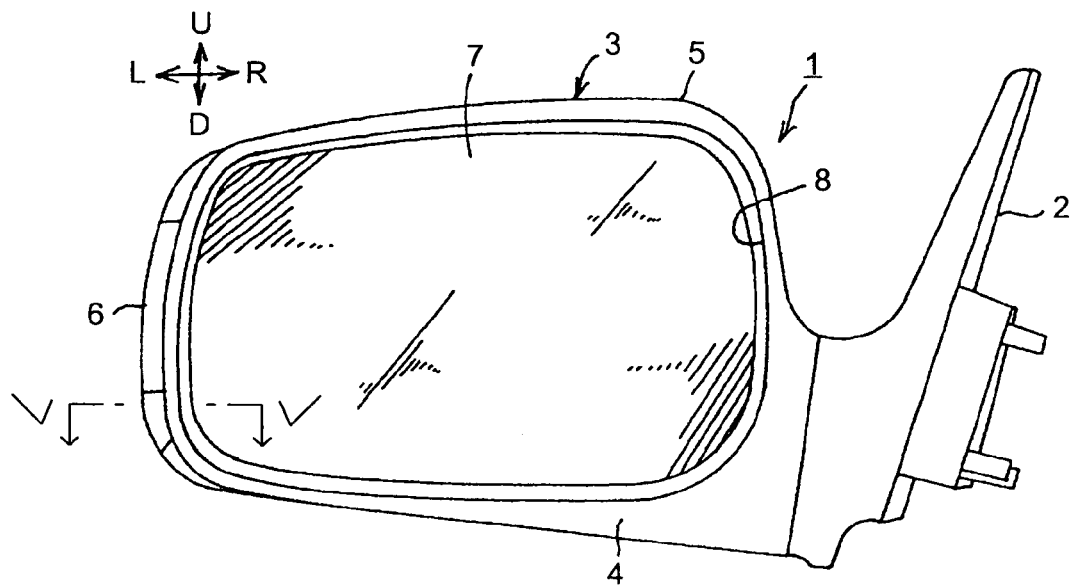
FIG. 2 is a front view of a door mirror according to the embodiment.
Figure 3:
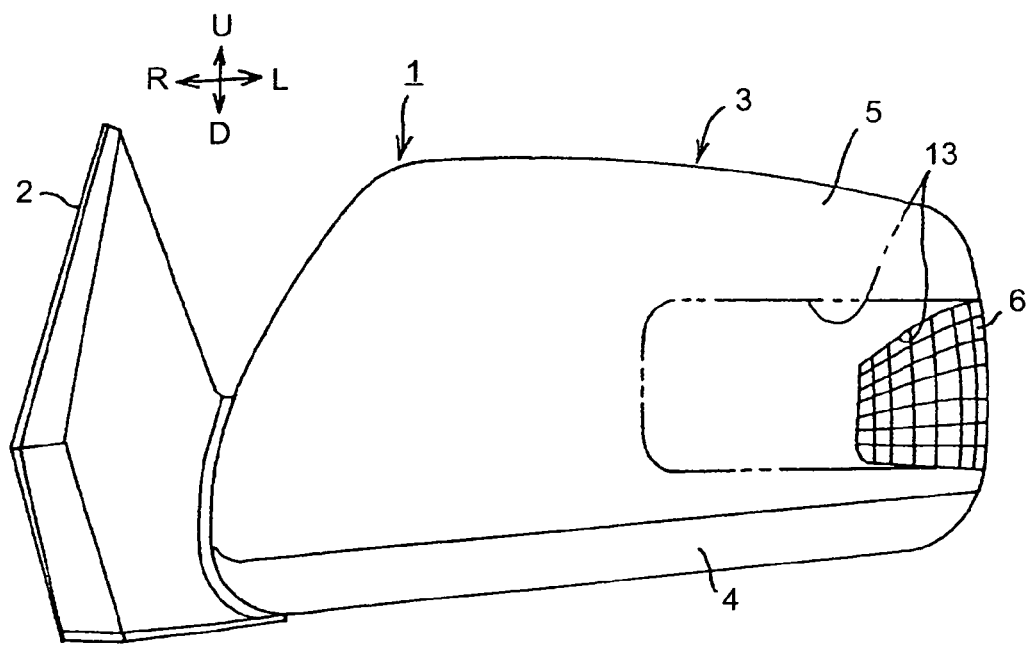
FIG. 3 is a back view of the door mirror.
Figure 4:
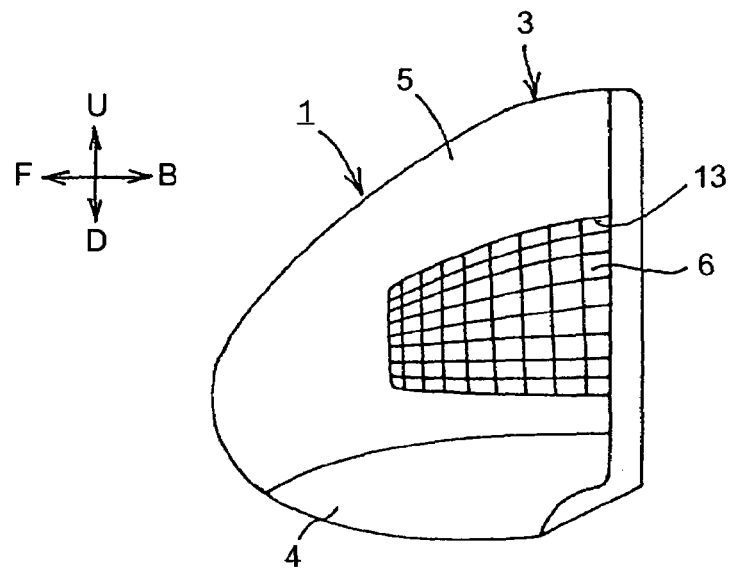
FIG. 4 is a left side view of the door mirror.

The door mirror 1 includes, as shown in FIGS. 2 and 3, a base 2 fixed to the door, and a mirror assembly 3 mounted on the base 2. The mirror assembly 3 includes, as shown in FIGS. 2 to 5, a mirror housing 4, a garnish 5, a side-turn signal lamp 6, and a mirror unit 7.

Figure 5:
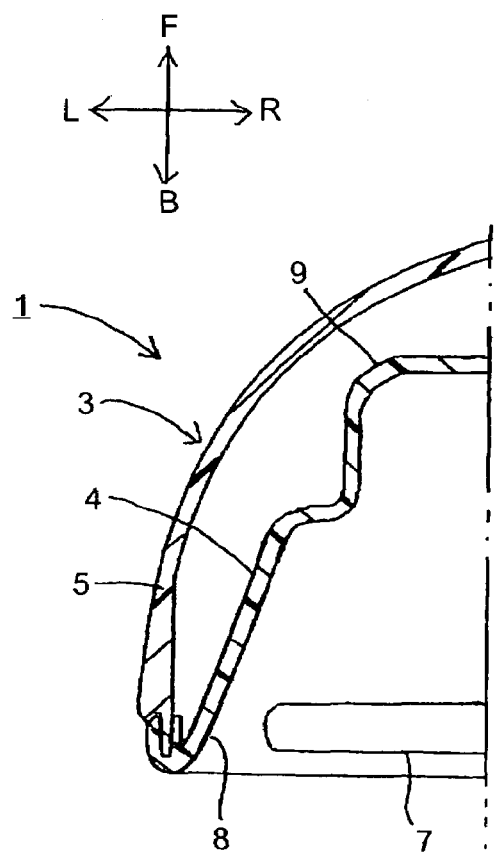
FIG. 5 is a cross section taken along a line V-V in FIG. 2.
Figure 6:
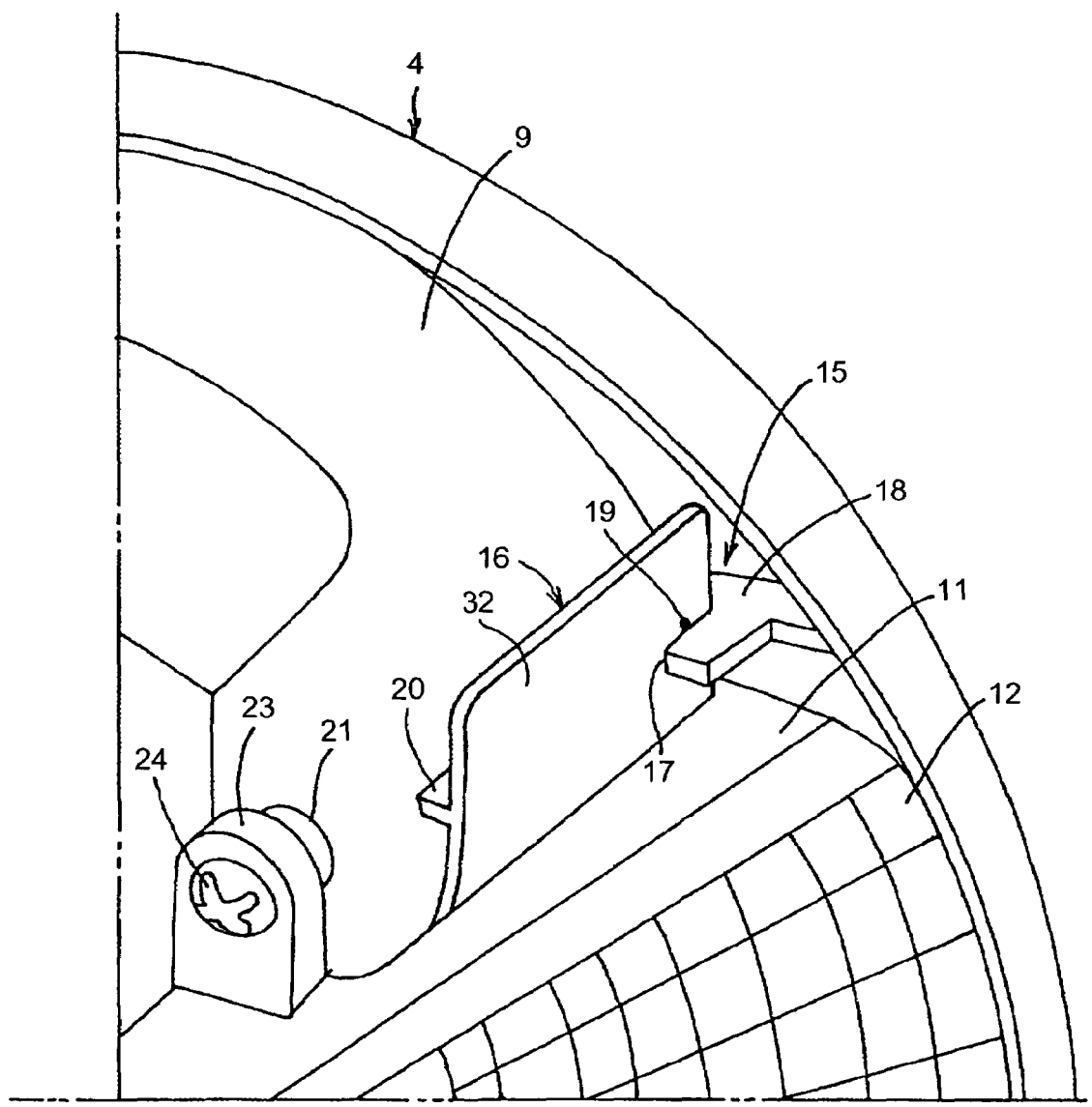
FIG. 6 is a partial perspective view of the mirror housing and the side-turn signal lamp in a fixed state.

The mirror housing 4 includes an opening 8 on the backside B as shown in FIGS. 2 and 5, and a part 9 (hereinafter, "cup portion") that is blocked up or covered except on the right side R as shown in FIGS. 1 and 5 to 11. The cup portion 9 includes a window 28 at approximately the center thereof on the front side F as shown in FIG. 1. The window 28 is used to wire a lamp harness 29 from the inside (backside B) to the back (front side F) of the mirror housing 4. The right side R of the mirror housing 4 is fixed to the base 2 by a screw (not shown) or the like. The mirror unit 7 is arranged in the opening 8 as shown in FIGS. 2 and 5. A power unit (not shown) is fitted to a fitting bracket (not shown) integrally formed with the base 2. The mirror unit 7 is fitted to the power unit to be tiltable in a horizontal direction (left and right) around a substantially vertical axis (not shown), and in a vertical direction (up and down) around a substantially horizontal axis (not shown). The mirror unit 7 has a reflecting surface for visually checking the backward of the vehicle.

Figure 7:
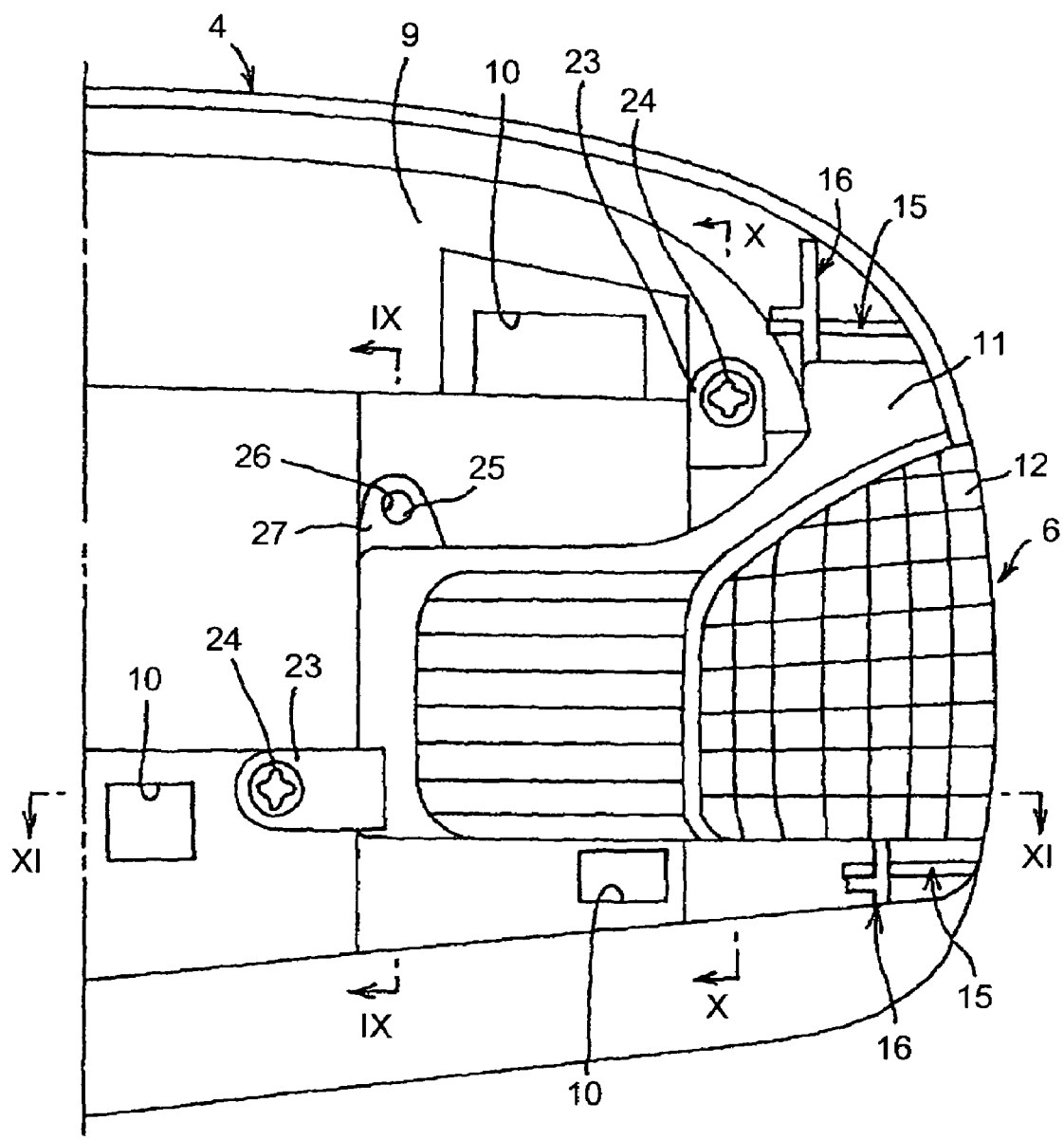
FIG. 7 is a partial back view of the mirror housing and the side-turn signal lamp in the fixed state.
Figure 8:
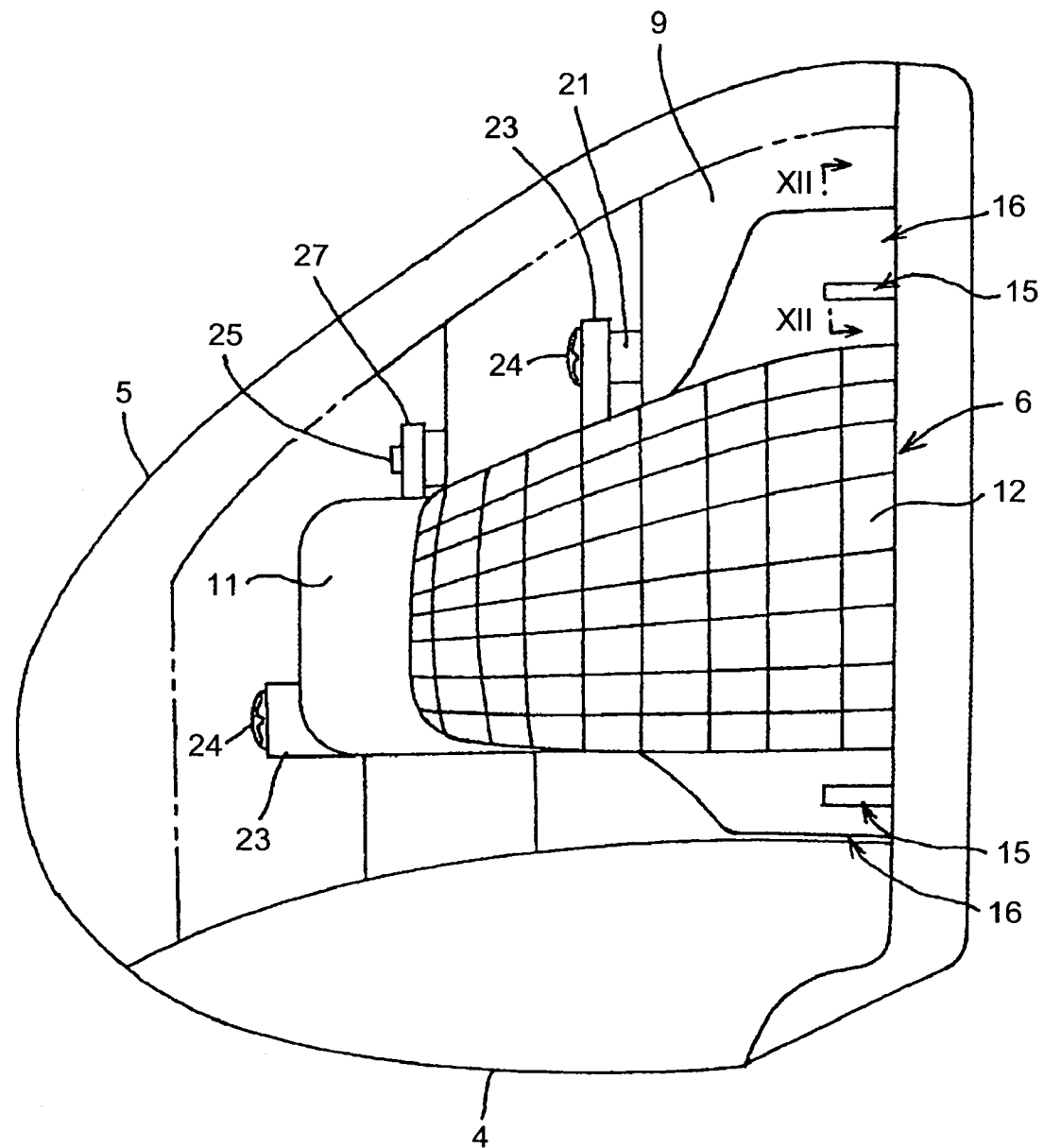
FIG. 8 is a side view of the mirror housing and the side-turn signal lamp in the fixed state.

As shown in FIGS. 2 to 5, and 9, to 12, the garnish 5 covers the front side F, the upside U, and the left side L of the cup portion 9. The garnish 5 constitutes a part of the mirror housing 4. The garnish 5 is separately provided for the front side F, the upside U, and the left side L of the mirror housing 4. The garnish 5 is a cover such as a skullcap or a design cover. A plurality of, for example, rectangle engaging holes 10 is formed in the cup portion 9 as shown in FIGS. 1 and 7. Inside the garnish 5 is arranged a plurality of engaging claws (not shown) corresponding to the engaging holes 10. By the engagement of the engaging claws with edges of the engaging holes 10, the garnish 5 is fixed to the mirror housing 4. As shown by the solid line in FIG. 3, and FIG. 4, a substantially trapezoidal notch 13 is provided in the portion from the left side L toward the front side F of the garnish 5.

The side-turn signal lamp 6 includes a lamp housing 11 and a lamp lens 12 that form a lamp chamber (not shown), and one or more light-emitting diodes (LEDs) (not shown) as a light source in the lamp chamber. The side-turn signal lamp 6 is fixed to the left side L and the front side F of the cup portion 9 by first fixing members 15 and 16, and second fixing members 21, 23 and 24. The lamp lens 12 is exposed outside from the notch 13. Between an edge of the notch 13, the lamp lens 12, and a sealing-contacting portion 32 (described later) is arranged a sealing member (gasket, packing, etc.) 14 as shown in FIGS. 10 and 12. The side-turn signal lamp 6 is used to inform other drivers and pedestrians of a change in the traveling direction or the like of the vehicle by a blinking amber (or yellow) light illuminated in a predetermined light distributing zone.

The front side F and the left side L of the cup portion 9, i.e., the portion to which the side-turn signal lamp 6 is fixed, is in a shape curving from the front side F toward the backside B as shown in FIG. 5. The side-turn signal lamp 6 has a shape that fits to the curved portion on the front side F and the left side L of the cup portion 9. As shown in FIGS. 1, 6 to 8, 12, 14, and 15, the first fixing members 15 and 16 are arranged at the upper and lower parts of the curved portion of the mirror housing 4 and the side-turn signal lamp 6 on the backside B. That is, the first fixing members 15 are located outside the mirror housing 4 to engage with the first fixing members 16 located at edges of the side-turn signal lamp 6.

An end of the opening 8 is adjacent to the edge portion of the outside of the mirror housing 4 (the curved portion on the backside B), leaving a little space on the edge portion as shown in FIG. 5. Therefore, although the second fixing members 21, 23 and 24 need a wider space than that for the first fixing members 15 and 16, it is difficult to secure the space for the second fixing members 21, 23 and 24 at the edge portion of the outside of the mirror housing 4. Accordingly, it is difficult to provide the second fixing members 21, 23 and 24 at the edge portion of the outside of the mirror housing 4. In other words, if the space for the second fixing members 21, 23 and 24 is secured at the edge portion of the outside of the mirror housing 4, the mirror housing 4 becomes large relative to the reflecting surface of the mirror unit 7. This causes the door mirror 1 to substantially protrude outward from each the left and right side of the vehicle, which is not desired in terms of safety driving and the design of the vehicle.

The first fixing members 15 and 16 function as guiding and positioning members, and are provided on the mirror housing 4 and the side-turn signal lamp 6 to guide and position the side-turn signal lamp 6 onto the mirror housing 4. Specifically, when the side-turn signal lamp 6 is temporarily fixed to the mirror housing 4, the first fixing members 15 and 16 position and guide the side-turn signal lamp 6 in a direction for setting it to the mirror housing 4, and in first and second directions substantially perpendicular to the setting direction and substantially perpendicular to each other.

With the first fixing members 15 and 16, the side-turn signal lamp 6 is temporarily fixed onto the curved portion of the mirror housing 4, with the opening 8 facing downward, by allowing the side-turn signal lamp 6 to fall under its own weight onto the curved portion. For this purpose, in the door mirror 1, the setting direction is from the front side F toward the backside B, the first direction is from the left side L to the right side R, and the second direction is from the upside U to the downside D.

The first fixing members 15 of the mirror housing 4 are formed of a couple of plates 18, which are substantially in parallel with each other in the setting direction. Each of the plates 18 includes a groove 17 in a substantial V-shape, having an entrance portion that tapers in the setting direction from the front side F toward the backside B, and an inside portion with its sides in parallel (with a constant width). Hereinafter, the first fixing member 15 is also referred to as a guide groove 15. The inner sides of the grooves 17 are substantially parallel.

On the other hand, the first fixing members 16 of the side-turn signal lamp 6 each include an insertion portion 19 that is inserted into the groove 17, a contacting portion 20 that contacts the plate 18, and the sealing-contacting portion 32 that contacts the edge of the notch 13 via the sealing member 14. That is, the first fixing member 16 is formed of a guide rail having a lateral T-shape. Hereinafter, the first fixing member 16 is also referred to as a guide rail 16. The thickness of the insertion portion 19 is substantially equal to or slightly larger than the width of the inner part of the groove 17.

When the side-turn signal lamp 6 is set on the mirror housing 4, the insertion portions 19 engage with the grooves 17, and thereby, position and guide the side-turn signal lamp 6 in the setting direction and the first direction. The contacting portion 20 is integrally formed with the insertion portion 19 on the right side R. On the upside U, the lower surface of the contacting portion 20 contacts the upper surface of the plate 18. On the downside D, the upper surface of the contacting portion 20 contacts the lower surface of the plate 18 (see FIGS. 12 and 15). The contacting portions 20 position and guide the side-turn signal lamp 6 in the second direction. The sealing-contacting portion 32 is integrally formed with the insertion portion 19 on the upside U and the downside D.

On the front side F of the mirror housing 4, the second fixing members 21, 23 and 24 are located at the curved portions of the cup portion 9 and the side-turn signal lamp 6. As shown in FIGS. 1, 10, and 11, the second fixing member 21 (hereinafter, also "hub") is integrally formed with the mirror housing 4 in the setting direction. The second fixing member 23 (hereinafter, also "attachment portion") has a tongue-like shape with a through hole 22, which is integrally formed with the side-turn signal lamp 6. The second fixing member 24 (hereinafter, also "screw") is screwed into the hub via the through hole 22.

As shown in FIGS. 1 and 9, a guide pin 25 is integrally formed with the front side F of the mirror housing 4 in the setting direction. On the other hand, a tongue-shaped guide 27 having a through hole 26 is integrally formed with the front side F of the side-turn signal lamp 6. The guide pin 25 and the guide 27 with the through hole 26 constitutes auxiliary guiding and positioning and fixing member.

In the following, how to fix the side-turn signal lamp 6 to the mirror housing 4 is explained.

Figure 14:
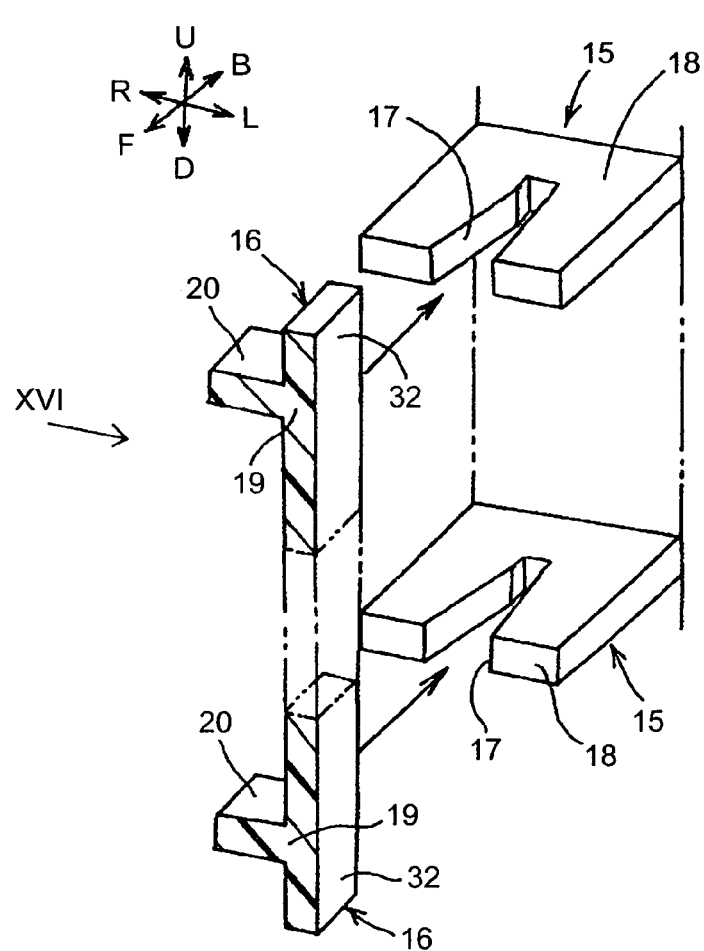
FIG. 14 is a partial perspective view of relevant parts before being temporarily fixed.
Figure 15:
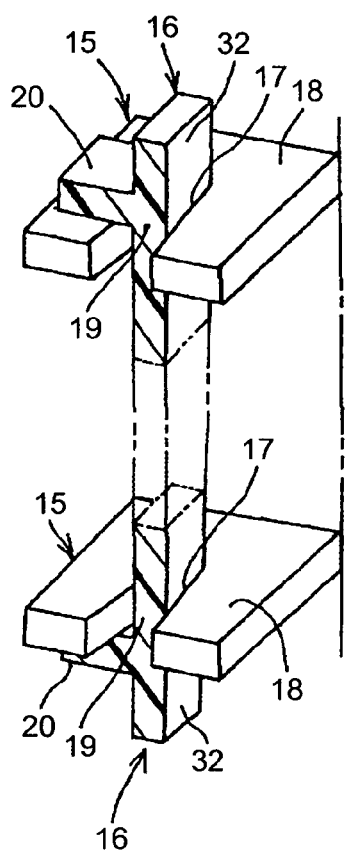
FIG. 15 is a partial perspective view of relevant parts after being temporarily fixed.

The right side R of the mirror housing 4 is fixed to the base 2 first. As shown in FIG. 1, the backside B of the mirror housing 4 is set downward. The side-turn signal lamp 6 is brought to about a predetermined position, i.e., the curved portion, in the cup portion 9 of the mirror housing 4. As shown in FIG. 14, the side-turn signal lamp 6 is set (fitted) to the curved portion of the mirror housing 4 by allowing the side-turn signal lamp 6 to fall under its own weight onto the curved portion. As shown in FIG. 15, the insertion portions 19 of the two guide rails 16 of the side-turn signal lamp 6 are guided into the grooves 17 of the two guide grooves 15 of the mirror housing 4 in the setting direction and in the left and right direction. Accordingly, the position of the side-turn signal lamp 6 in the setting direction (the direction of the backside B) and in the left and right L-R direction is determined. The contacting portions 20 of the two guide rails 16 respectively contact the plates 18 of the two guide grooves 15, and are guided in the vertical direction. Accordingly, the position in the up and down U-D direction is determined.

Figure 16:
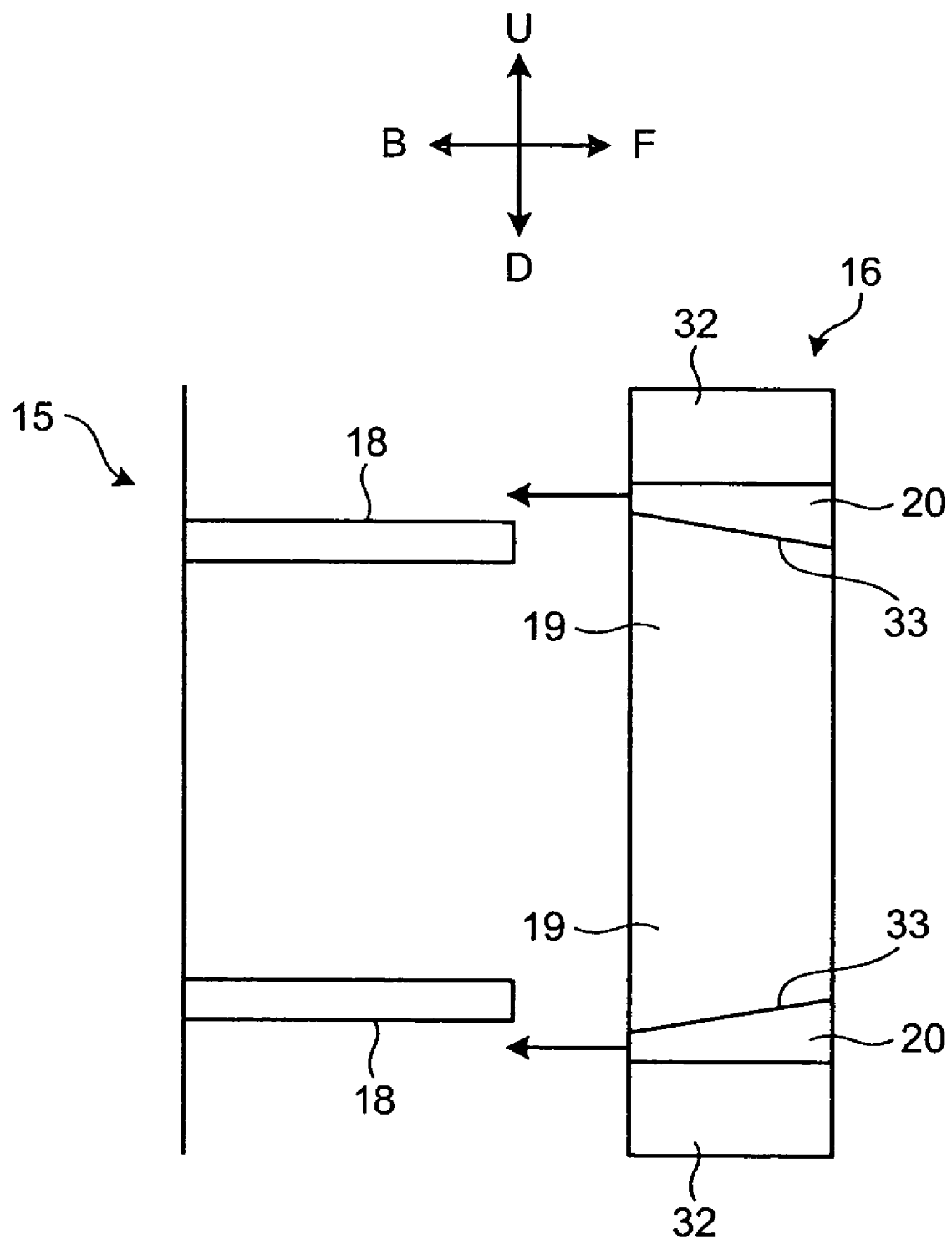
FIG. 16 is a view on arrow XVI in FIG. 14.

The thickness of the insertion portions 19 is substantially equal to or slightly larger than the width of the inner part of the groove 17. Therefore, when the side-turn signal lamp 6 is pushed toward the mirror housing 4, the insertion portions 19 bite into the inner parts of the grooves 17. Accordingly, the side-turn signal lamp 6 can be temporarily fixed to the mirror housing 4 more reliably. If a contacting surface 33 of the contacting portion 20 is inclined as shown in FIG. 16, the side-turn. signal lamp 6 can be guided and positioned on the mirror housing 4 more easily and reliably.

Thus, the side-turn signal lamp 6 is temporarily fixed to the mirror housing 4 easily and reliably by the first fixing members 15 and 16. At this time, the two attachment portions 23 of the side-turn signal lamp 6 are placed on the two hubs 21 of the mirror housing 4. The through hole 26 in the guide 27 of the side-turn signal lamp 6 is engaged with the guide pin 25 of the mirror housing 4.

The two screws 24 are then screwed into the hubs 21 via the through holes 22 in the attachment portions 23. As a result, the side-turn signal lamp 6 is securely fixed to the mirror housing 4 by the second fixing members 21, 23 and 24. Thus, the side-turn signal lamp 6 is reliably fixed to the mirror housing 4 by the second fixing members 21, 23 and 24 in combination with the first fixing members 15 and 16. A connector 31 (see FIG. 9) of the side-turn signal lamp 6 fixed to the mirror housing 4 is connected to a connector 30 of the lamp harness 29. After the side-turn signal lamp 6 is fixed, the garnish 5 is fixed to the mirror housing 4. Incidentally, the side-turn signal lamp 6 can be fixed to the mirror housing 4 before or after the mirror unit 7 and the power unit are fixed to the base 2 (fitting bracket). Further, at the time of fixing the garnish 5 to the mirror housing 4, as shown in FIG. 12, the sealing member 14 is put between the edge of the notch 13 in the garnish 5 and the sealing-contacting portions 32 of the side-turn signal lamp 6.

The operation and effect of the outside mirror apparatus (the door mirror 1) according to the embodiment is explained next.

The side-turn signal lamp 6 is roughly set in the curved portion (a part to which the side-turn signal lamp 6 is fixed) of the mirror housing 4. As shown in FIGS. 12 and 15, the insertion portions 19 respectively bite into the grooves 17 in the two plates 18 to guide and position the side-turn signal lamp 6 in the setting direction (front and back F-B direction) and in the first direction (left and right L-R direction). The contacting portions 20 respectively contact the two plates 18 to thereby guide and position the side-turn signal lamp 6 in the second direction (upward and downward U-D direction). In other words, the side-turn signal lamp 6 is guided and positioned on the mirror housing 4 in the setting direction (front and back F-B direction), the first direction (left and right L-R direction), and the second direction (up and down U-D direction) by the two guide grooves 15 on the mirror housing 4 side and the two guide rails 16 on the side-turn signal lamp 6 side (the first fixing members 15 and 16). Thereafter, the side-turn signal lamp 6 is securely fixed to the mirror housing 4 by the second fixing members 21, 23 and 24, i.e., the two hubs 21, the two attachment portions 23 with the through holes 22, and the two screws 24. Thus, the side-turn signal lamp 6 can be easily and reliably fixed to the mirror housing 4.

As described above, according to the embodiment, the first fixing members 15 on the mirror housing 4 side are formed of the two plates 18 respectively provided with the grooves 17, and the first fixing members 16 on the side-turn signal lamp 6 side each include the insertion portion 19, the contacting portion 20, and the sealing-contacting portion 32. That is, the first fixing members 15 and 16 have a simple structure, which reduces the manufacturing cost of the door mirror 1.

The edge portion of the outside of the mirror housing 4 and that of the side-turn signal lamp 6, in which it is difficult to provide the second fixing members 21, 23 and 24, can be temporarily fixed together by the first fixing members 15 and 16. Then, the side-turn signal lamp 6 that has been temporary fixed to the mirror housing 4 by the first fixing members 15 and 16 is securely fixed by the second fixing members 21, 23 and 24. The side-turn signal lamp 6 can thereby be firmly fixed to the mirror housing 4, and it can be reliably prevented that the side-turn signal lamp 6 moves or becomes unstable on the mirror housing 4.

When the lamp lens 12 as a part of the side-turn signal lamp 6 is exposed outside from the notch 13 provided in the garnish 5 constituting a part of the mirror housing 4, as shown in FIG. 12, the sealing-contacting portion 32 of each of the first fixing members 16 in the side-turn signal lamp 6 contacts the edge of the notch 13 of the garnish 5 via the sealing member 14. Therefore, the edge of the notch 13 can be reliably supported by the sealing-contacting portion 32 of the side-turn signal lamp 6 via the sealing member 14. Thus, the rigidity of the edge of the notch 13 can be increased, which reliably prevents deformation of the garnish 5, and firmly maintains the shape of the garnish 5. Specifically, when the notch 13 is long in the left and right L-R direction as shown by the two-dot chain line in FIG. 3, the shape-maintaining effect can be further improved in the garnish 5.

While the door mirror has been explained in the embodiment, the present invention is also applicable to other outside mirrors including a fender mirror and a truck mirror.

In the embodiment, the mirror assembly 3 cannot tilt down relative to the base 2. However, the mirror assembly can tilt down relative to the base 2 manually, electrically, or by a buffer operation.

In the embodiment, the side-turn signal lamp 6 is explained as the additional part. However, the additional part can be a lighting system other than the side-turn signal lamp 6, or an image pickup device such as a charge-coupled device (CCD) camera.

In the embodiment, two guide grooves and two guide rails are provided as the first fixing members 15 and 16. However, three or more guide grooves and guide rails can be provided as the first fixing members 15 and 16.

In the embodiment, two hubs, two attachment portions each having a through hole and two screws are provided as the second fixing members 21, 23 and 24. However, one or three or more hubs, attachment portions each with a through hole and screws can be provided as the second fixing members 21, 23 and 24.

The guide pin 25 and the guide 27 having the through hole 26 used in the embodiment is not necessarily provided.

The sealing-contacting portion 32 provided in the embodiment in each of the first fixing members 16 of the side-turn signal lamp 6, which contacts the edge of the notch 13 in the garnish 5 via the sealing member 14 as shown in FIG. 12, is not necessarily provided as shown in FIG. 13.

In the embodiment, as shown in FIG. 12, the contacting portions 20 are provided on the right side R of the insertion portions 19. However, the contacting portions 20 can be provided on the left side L of the insertion portions 19, or can be provided alternately left and right.

In the embodiment, as shown in FIGS. 12 and 15, the lower surface of the contacting portion 20 contacts the upper surface of the plate 18 on the upside U, and the upper surface of the contacting portion 20 contacts the lower surface of the plate 18 on the downside D. However, on the contrary thereto, the upper surface of the contacting portion 20 can contact the lower surface of the plate 18 on the upside U, and the lower surface of the contacting portion 20 can contact the upper surface of the plate 18 on the downside D.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An outside mirror apparatus for a vehicle comprising:
    a mirror housing that includes a first fixing member and a second fixing member; and
    an attachment that includes
        a third fixing member engaged with the first fixing member to temporarily fix the attachment to the mirror housing; and
        a fourth fixing member engaged with the second fixing member to firmly fix the attachment to the mirror housing, wherein
    when the attachment is temporarily fixed to the mirror housing, the first and third fixing members position and guide the attachment in a setting direction in which the attachment is set on the mirror housing and in first and second directions substantially perpendicular to the setting direction and substantially perpendicular to each other,
    wherein one of the first and third fixing members includes a plate substantially parallel to the setting direction with a groove that tapers in the setting direction, and
    the other one of the first and third fixing members includes
        an insertion portion that engages with the groove and, positions and guides the attachment in the setting direction and the first direction; and
        a contacting portion that contacts the plate, and positions and guides the attachment in the second direction, and
    wherein the mirror housing includes a garnish having an opening,
        a part of the attachment is exposed from the opening, and
        the other one of the first and third fixing member further includes a sealing-contacting portion integral with the insertion portion that indirectly contacts an edge of the opening via a sealing member.

2. The outside mirror apparatus for a vehicle according to claim 1, wherein
    the first fixing member is located at any one of an edge of outside of the mirror housing and an edge of outside of the attachment, and
    the third fixing member is located at another one of the edge of the outside of the mirror housing and the edge of the outside of the attachment.

3. The outside mirror apparatus for a vehicle according to claim 1, wherein a contacting surface of the contacting portion is inclined.

* * * * *